United States Patent
Sava et al.

(10) Patent No.: US 9,043,697 B2
(45) Date of Patent: May 26, 2015

(54) DISPLAYING THE SAME DOCUMENT IN DIFFERENT CONTEXTS

(75) Inventors: Michael Sava, Peekskill, NY (US); Lisa M. Ungar, Shrub Oak, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1401 days.

(21) Appl. No.: 11/756,180

(22) Filed: May 31, 2007

(65) Prior Publication Data

US 2008/0301540 A1 Dec. 4, 2008

(51) Int. Cl.
*G06F 17/00* (2006.01)
*G06F 17/21* (2006.01)
*G06F 17/24* (2006.01)
*G06F 9/44* (2006.01)
*G06F 3/0484* (2013.01)
*G06F 3/0481* (2013.01)
*G06F 17/22* (2006.01)
*G06F 3/0482* (2013.01)

(52) U.S. Cl.
CPC .............. *G06F 17/211* (2013.01); *G06F 17/24* (2013.01); *G06F 9/4443* (2013.01); *G06F 3/04845* (2013.01); *G06F 3/0481* (2013.01); *G06F 17/2247* (2013.01); *G06F 17/227* (2013.01); *G06F 3/0482* (2013.01); *G06F 3/04842* (2013.01); *G06F 17/2264* (2013.01)

(58) Field of Classification Search
CPC ... G06F 17/2247; G06F 17/24; G06F 17/211; G06F 17/227; G06F 17/2264; G06F 9/4443; G06F 3/0481; G06F 3/0482; G06F 3/0485; G06F 3/04842; G06F 3/0487; G06F 3/0483
USPC ......... 715/808, 234–238, 243–247, 715, 800, 715/788, 202–204, 796
See application file for complete search history.

(56) References Cited

U.S. PATENT DOCUMENTS

| 6,065,024 | A | * | 5/2000 | Renshaw ..................... 715/234 |
| 6,857,102 | B1 | * | 2/2005 | Bickmore et al. ............. 715/205 |
| 2005/0034056 | A1 | * | 2/2005 | Rubin et al. .................. 715/500 |
| 2005/0071755 | A1 | * | 3/2005 | Harrington et al. ........... 715/511 |
| 2006/0085743 | A1 | * | 4/2006 | Baudisch et al. ............. 715/526 |
| 2006/0156247 | A1 | * | 7/2006 | McCormack et al. ........ 715/767 |
| 2008/0082911 | A1 | * | 4/2008 | Sorotokin et al. ............. 715/236 |
| 2008/0120538 | A1 | * | 5/2008 | Kurz et al. .................... 715/255 |

OTHER PUBLICATIONS

Hall. et al., "Linking in Context", Published 2001 by ACM pp. 151-160.*
Hall et al., "Linking in Context" Published 2001 pp. 151-160 by ACM.*

* cited by examiner

Primary Examiner — Quoc A Tran
(74) Attorney, Agent, or Firm — F. Chau & Associates, LLC

(57) ABSTRACT

A computer readable medium is provided embodying instructions executable by a processor to perform a method for modifying a document according to a display context, the method including providing a document for display, the document comprising a function for determining a display context and modifying a style of the document, determining the display context for display of the document, modifying the style of the document according to the context, and displaying the document according to a modified style.

7 Claims, 4 Drawing Sheets

DISPLAYING THE SAME DOCUMENT IN DIFFERENT CONTEXTS

BACKGROUND OF THE INVENTION

1. Technical Field

The present invention relates to document presentation. More specifically, the present invention relates to processing a document to display the document differently depending on a context of the document.

2. Description of Related Art

Existing systems for display of a document used controls which specify, for example, a normal view, an outline view, a zoomed view, a paged view, etc. However, the foregoing concept is limited in scope.

These systems avoid duplication of content by customizing the same content for reuse based on the display context. Some examples of the technologies used to provide this context sensitive display of content include Extensible Markup Language (XML), Cascading Style Sheets (CSS) and JavaScript.

Much of the content displayed on the world wide web is duplicated in different documents in order to render the content in multiple display contexts needed by users. The types of display contexts include popup windows, full windows, etc., display on limited function personal digital assistants, full function displays, displaying the same content with different navigation options, mastheads and footers. The content can be accessed directly via an address such as a URL or indirectly by the user clicking on a link.

These systems for customizing the reuse of content based on the display context are limited by their dependence on stored user preferences.

Therefore, a need exists for an improved method for displaying a document differently depending on a context.

SUMMARY OF THE INVENTION

According to an embodiment of the present disclosure, a computer readable medium is provided embodying instructions executable by a processor to perform a method for modifying a document according to a display context, the method comprising providing a document for display, the document comprising a function for determining a display context and modifying a style of the document, determining the display context for display of the document, modifying the style of the document according to the context, and displaying the document according to a modified style.

The method includes assigning a window name to the document.

The display context is determined according to a location sensitive attribute.

According to an embodiment of the present disclosure, a computer readable medium is provided embodying instructions executable by a processor to perform a method for creating a link in a document for displaying the document in a different context. The method comprises storing a collection of documents stored in a database, selecting a document from the collection, presenting a plurality of different potential visual representations for a selected document for selection by a user, determining a selected visual representation, creating a link to the selected document which specifies a style of the selected document according to a chosen visual representation, and displaying at least one of the selected documents.

The method includes determining a context for display of the selected document, modifying the style of the selected document upon determining that a context is different than the chosen, visual representation.

The link is associated with selected text of the document in a different visual representation than the chosen visual representation.

The method includes displaying the link in a graphical user interface for creating the link.

BRIEF DESCRIPTION OF THE FIGURES

Preferred embodiments of the present disclosure will foe described below in more detail, with reference to the accompanying drawings.

DETAILED DESCRIPTION OF PREFERRED EMBODIMENTS

Embodiments of the present invention disclosure herein are intended to foe illustrative only, since numerous modifications and variations therein will be apparent to those of ordinary skill in the art. In reference to the drawings, like numbers will indicate like parts continuously throughout the views.

According to an embodiment of the present disclosure, a document, such as a web page, is augmented by an application, e.g., JavaScript and CSS files, to be displayed differently depending on context, for example, being presented in full screen vs. popup windows. According to an embodiment of the present disclosure, content reuse uses location sensitive attributes and values within a document's environment to dynamically determine the display context. For example, a parameter of a window.open( ) method may be determined by the function to determine a context. Document reuse in different contexts is implemented using transformations of styles of the document.

An application creates more than one identical or similar document; during a linking process, an author has a choice to link to a document capable of being displayed differently in different windows.

In an exemplary implementation, in the case of popup contexts, the design of documents and associated programming tools enable the same document to be displayed as a popup without the associated navigation, elements.

Figure 1A:
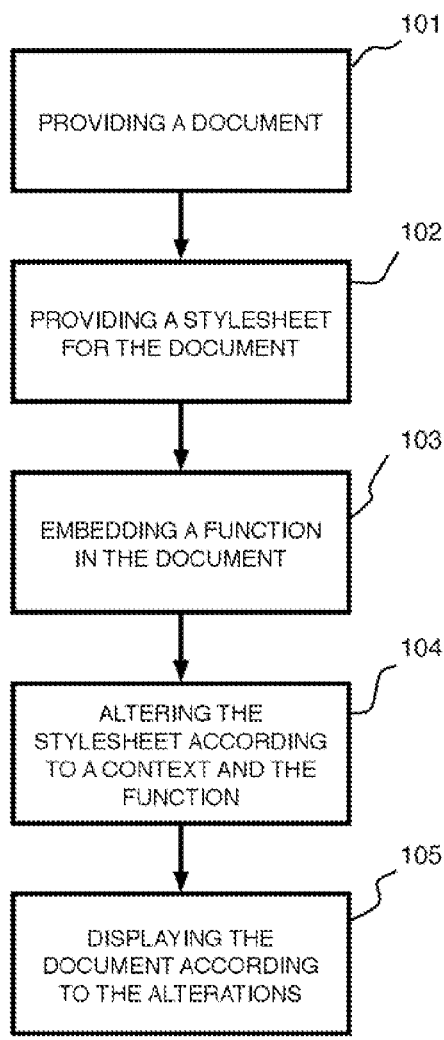
FIG. 1A is a flow chart of a method for displaying a document in different contexts according to an embodiment of the present disclosure.

Referring to FIG. 1A, an input document is authored or provided 101, and using a combination of CSS and JavaScript along with HTML authoring of documents, content is produced for the document, e.g., a single page, to be used in multiple contexts. A main style (e.g., a CSS) is used to render the main view of an HTML document with all the elements visible 102, including mastheads, navigation, footers, etc. In addition, the HTML document has a JavaScript function, or set of functions, embedded in it 103 that generates the popup window if called, explicitly assigning a window name and altering the main styles 104 to produce a web page with the same content but a different visual experience based on the current window name 105.

The follow exemplary HTML code shows empty script and style elements:

```
<!DOCTYPE html PUBLIC "-//W3C//DTD XHTML 1.0
Transitional//EN"
        "http://www.w3.org/TR/xhtml1/DTD/xhtml1-
transitional.dtd">
<html xmlns="http://www.w3.org/1999/xhtml" xml:lang="en"
lang="en">
<head>
<title>Popup Window</title>
<script type="text/javascript">
<!--
        //SCRIPT TO MODIFY STYLE
//-->
</script>
<style type="text/css">
<!--
//-->
</style>
</head>
<body>
.
.
.
</body>
</html>
```

The embedded function, e.g., in a script element of the HTML document, is evaluated as the document loads, wherein the function determines current attributes and values of the environment and determines whether to modify a style of the document to affect a display of contents of the document according to the attributes and values of the environment, e.g., the context.

Figure 2A:
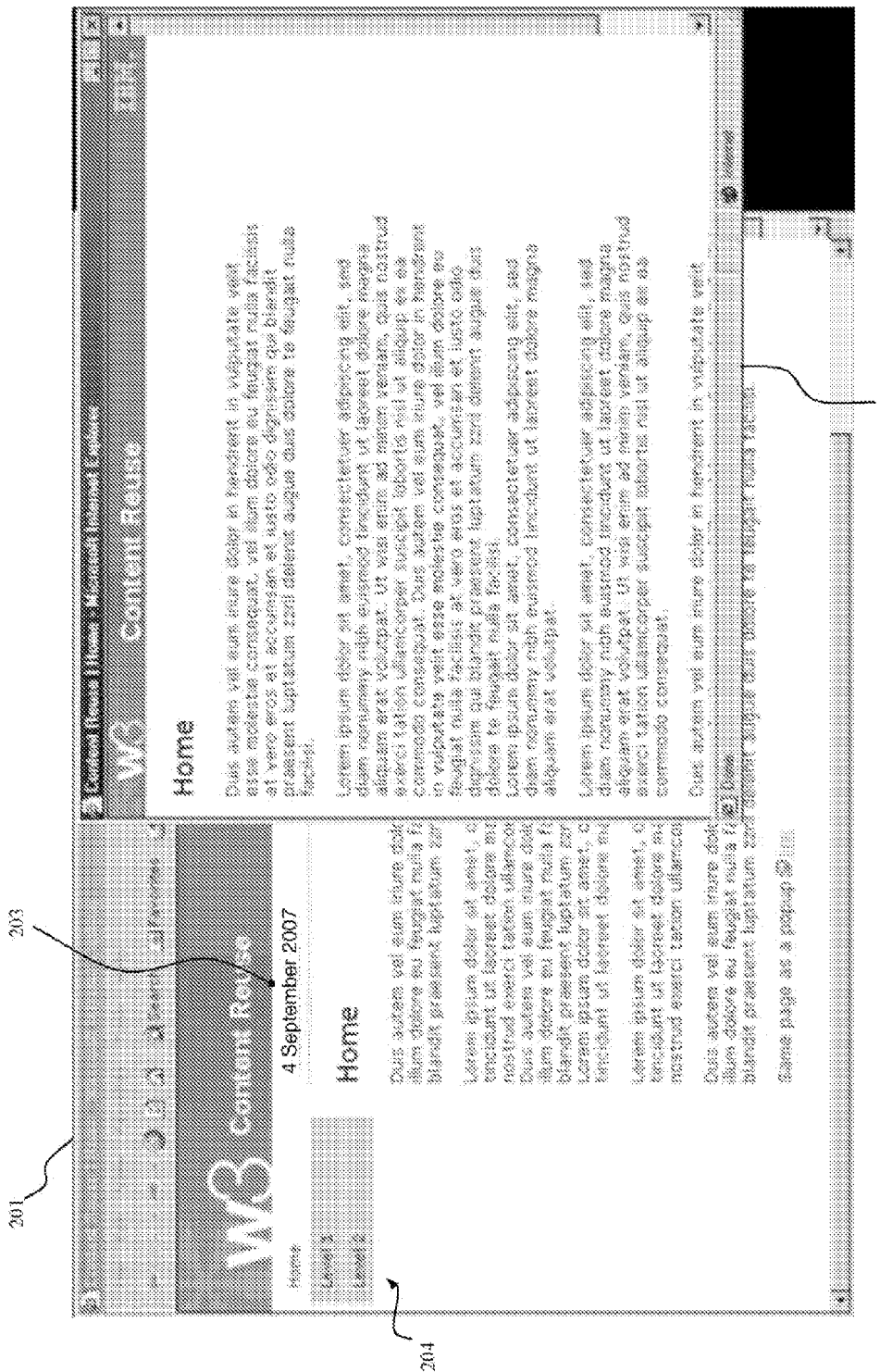
FIG. 2A is an illustration of a document being displayed in different contexts.

FIG. 2A shows a normal web page view 201 and a popup web page view 202 of the same document. In FIG. 2A it can be seen that the function of the document has modified the style of document displayed in the popup window to hide the indication of date 203 and navigation tools 204, which are displayed in the normal window 201.

The HTML document author would therefore be able to create context sensitive pages by inserting appropriate functions in HTML documents that have already been created.

In another exemplary implementation, using the exemplary methodology of FIG. 1A, for the design of documents, a document database and associated programming tools are provided which enable an HTML document author to choose and automatically create links between HTML documents and to select a context, e.g., main view or popup view, in which the documents are to be displayed.

Figure 1B:
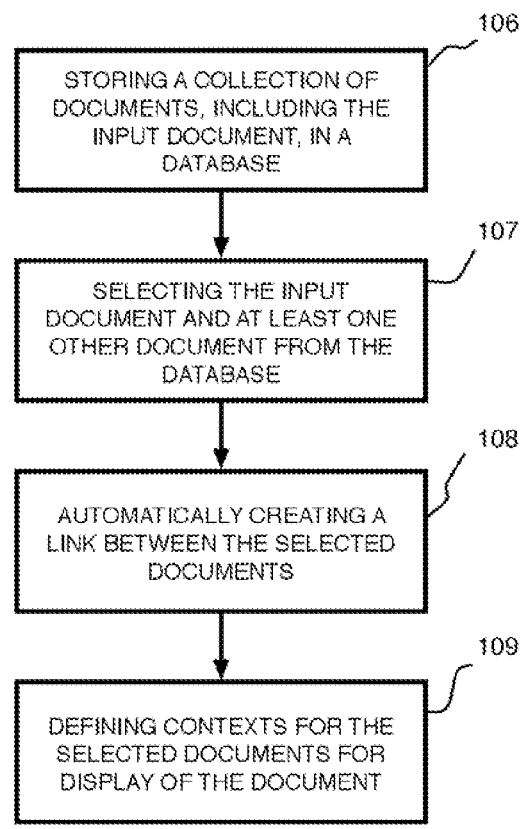
FIG. 1B is a flow chart of a method for automatic link selection and generation in a document adapted for context based display, according to an embodiment of the present disclosure.

Referring to FIG. 1B, using a document database for HTML authoring, CSS and JavaScript, an HTML document author can produce a collection of HTML web pages. According to an embodiment of the present disclosure, by having a collection of documents stored in a central database 106, e.g., wherein an application for authoring the HTML web pages is aware of the web pages for a site, e.g., page names such as index.html. Different representations of the documents may be selected for display in different display environments. The author is presented with a graphical user interface (GUI) for selecting documents from the collection 107 and automatically creating links between those documents 108. Given these links, the author can choose which visual representation, for example, a normal web page view or a popup web page view, in which to display each HTML document 109. A function is embedded in each selected document, or modified if already present, to alter a corresponding style of each selected document according to chosen visual representations (see FIG. 1A).

Figure 2B:
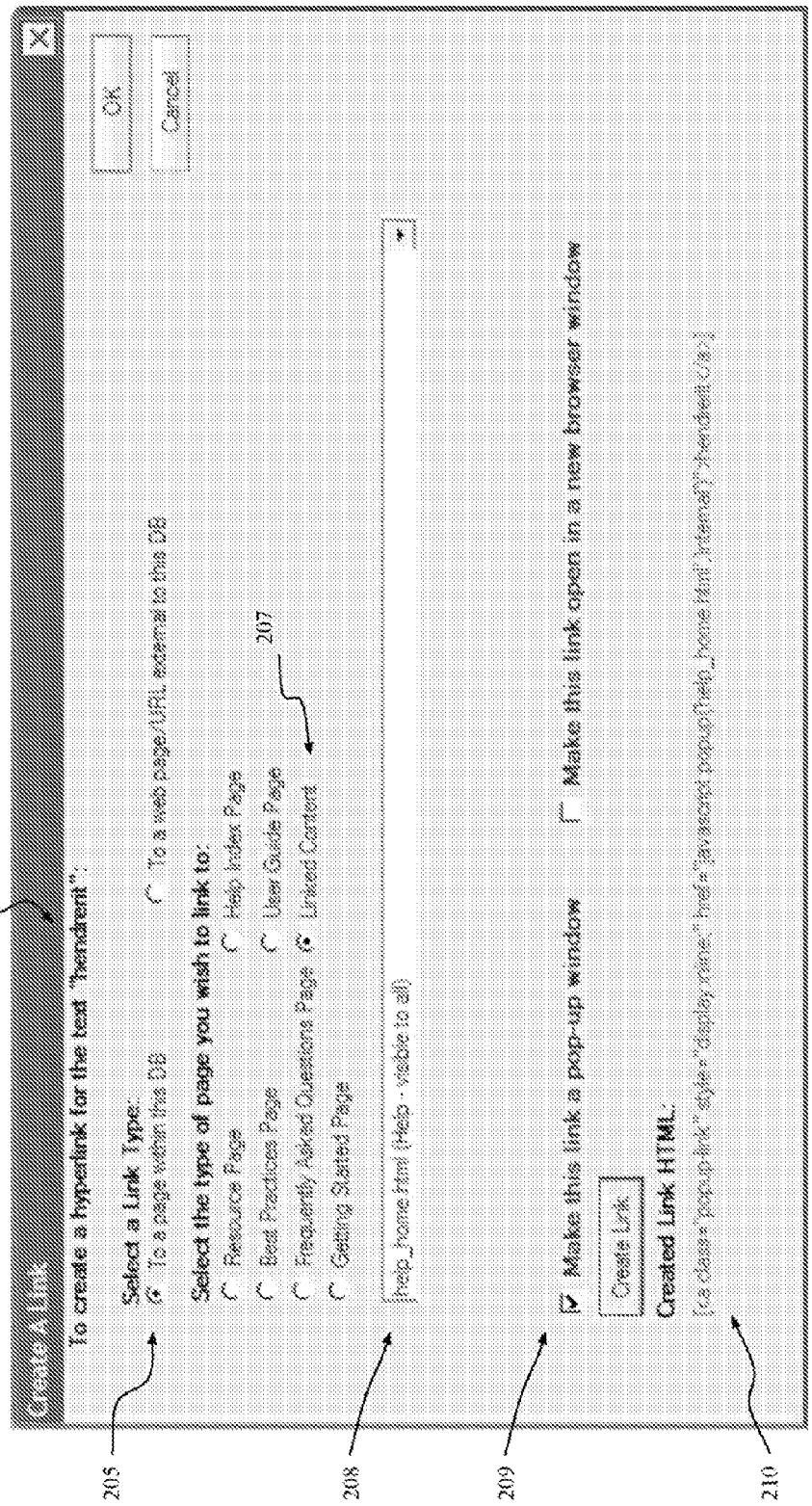
FIG. 2B is an illustration of a graphical user interface for creating a HTML document comprising a link for displaying a document in different contexts according to an embodiment of the present disclosure.

Referring to FIG. 2B, the selection of documents and contexts for authoring a web site including documents may be performed through the GUI, which for example, allows an author to select a type of link 205 associated with selected text 206 (e.g., selected from an HTML editor), select a type of page to be linked to, including linked content 207, the page to be linked to 208 and a default context 209. The GUI may also display the created link 210 inserted into the authored HTML document. Should the context be different than the default context, the embedded function will adapt the document to the actual context (see for example, FIG. 1A), for example, if a user explicitly changes a context by specifying a tabbed view context rather than a popup window view of the document.

It is to foe understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 3:
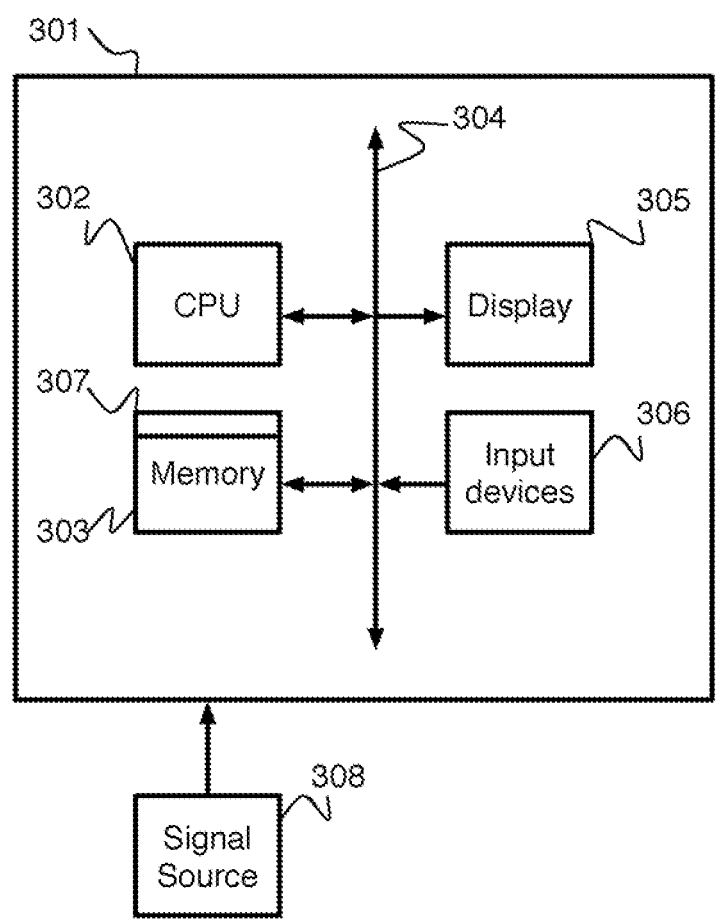
FIG. 3 is a diagram of a system according to an embodiment of the present invention.

Referring to FIG. 3, according to an embodiment of the present invention, a computer system 301 for implementing a method for displaying a document differently depending on a context can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present invention.

The computer platform 301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system, components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a mechanism and method for displaying a document differently depending on a context, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A non-transitory computer readable storage medium embodying instructions executable by a processor to perform a method for modifying a document according to a display context, the method comprising:

presenting a document author with a graphical user interface for selecting documents from a collection of documents;

automatically creating links between the selected documents;

receiving, from the document author, a choice of a visual representation for each of the selected documents, the choice of the visual representation being either a normal web page view or a popup web page view;

producing content for the selected documents, wherein each of the selected documents comprises a style defined by code of the input document and an executable JavaScript function embedded therein for generating a popup window when called, wherein the executable JavaScript function of each of the selected documents explicitly assigns a window name to the popup window and modifies the style of the content in accordance with the choice of visual representations received from the document author to produce a web page with the content, and wherein the executable JavaScript function of each of the selected documents provides a visual experience for the popup window that is based on the assigned window name; and displaying the produced web page.

2. The method of claim 1, wherein the style of the popup window is modified, by the executable JavaScript function, according to a determined display context for the document.

3. The method of claim 2, wherein the display context is determined according to a location sensitive attribute.

4. A non-transitory computer readable storage medium embodying instructions executable by a processor to perform a method for creating a link in a document for displaying the document in either a main view or a popup view, the method comprising:

storing a collection of input documents in a database;

presenting a document author with a graphical user interface for selecting a plurality of input documents from the collection of input documents stored in the database;

creating a set of links between the selected input documents;

receiving, from the document author, a choice of a visual representation contexts, including a main view and a popup view for each of the plurality of selected input documents, the choice of the visual representation being either a normal web page view or a popup web page view;

providing content for each of the selected input document;

embedding or modifying an executable JavaScript function in the selected input documents, wherein the executable JavaScript function of the selected input documents is configured to alter the produced content of the selected documents by defining a style of the produced content of the selected documents according to the chosen visual representation contexts; and displaying the selected document including the altered content of the selected documents.

5. The method of claim 4, wherein the executable JavaScript function of the selected input documents is configured for:

determining a window name for display of the content of the selected documents; and defining the style of the content based on the determined window name.

6. The method of claim 4, wherein the link is associated with selected text of the content of the selected documents in a different visual representation contexts than the chosen visual representation contexts.

7. The method of claim 4, further comprising displaying the link in a graphical user interface for creating the link.

* * * * *